United States Patent Office

3,567,834
Patented Mar. 2, 1971

3,567,834
METHOD OF PRODUCING SEDATION
Edmund Stanley Granatek and Alphonse Peter Granatek, Baldwinsville, N.Y., assignors to Bristol-Myers Company, New York, N.Y.
No Drawing. Continuation-in-part of application Ser. No. 605,156, Dec. 28, 1966. This application June 16, 1969, Ser. No. 833,739
Int. Cl. A61k 27/00
U.S. Cl. 424—311
5 Claims

ABSTRACT OF THE DISCLOSURE 2,2,2-tribromoethyl glycinate and 2,2,2-trichloroethyl glycinate, and the pharmaceutically acceptable salts thereof, are compounds possessing sedative-narcosis activity in mammals.

The compounds of the invention, particularly the 2,2,2-trichloroethyl glycinate hydrochloride, have been found to be as effective as chloral hydrate in producing sedation when administered on a molar equivalent dosage basis to mammals.

CROSS-REFERENCE TO RELATED APPLICANTS

This application is a continuation-in-part of our application Ser. No. 605,156, filed Dec. 28, 1966.

BACKGROUND OF THE INVENTION (1) Field of the invention

This invention relates to new hypnotic-sedatives and their pharmaceutically acceptable salts.

(2) Description of the prior art

Compounds of the prior art possessing similar activity, in particular chloral hydrate, are characterized by their peculiar pungent odor and taste and have been particularly difficult to formulate into palatable products. The compounds of the present invention overcome this difficulty.

SUMMARY OF THE INVENTION

The compounds of the present invention are characterized as having the formula

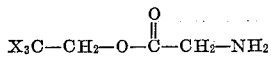

wherein X is either chloro or bromo; and includes the pharmaceutically acceptable salts thereof.

This invention relates to the chemical compounds 2,2,2-tribromoethyl glycinate and 2,2,2-trichloroethyl glycinate, and to the pharmaceutically acceptable nontoxic salts thereof, all of which compounds are useful as sedative-hypnotics in mammals.

The compounds of the present invention have the formula

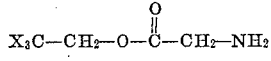

wherein X is either chloro or bromo; and which include the pharmaceutically acceptable nontoxic salts thereof.

The nontoxic salts that are pharmaceutically acceptable include the hydrochlorides, hydrobromides, hydroiodides, (lower)alkylsulfates, (lower)alkyl and aryl sulfonates, phosphates, sulfates, maleates, fumarates, succinates, tartrates, citrates, and others commonly used in the art.

The salts obtained through the variation of the acid used may in some cases have special advantage due to increased solubility, decreased solubility, ease of crystallization, lack of objectionable taste, etc., but these are all subsidiary to the main physiological action of the free base which is independent of the character of the acid used in the preparation of the salt.

The compounds of the present invention may be embodied in any of the known pharmaceutical forms for oral, parenteral or rectal administration. The compounds may be prepared in solid compositions for oral administration in unit dosage form as tablets, capsules, pills, granules or powders. Solutions, emulsions or suspensions of the compounds may be prepared for oral administration also. Sterial suspensions or solutions may be prepared for parenteral use. When desirable, the compound may be incorporated in suppositories for rectal administration.

The term unit dosage form as used in the specification and claims means a physically distinct entity suitable as a unitary dosage for administration, each unit containing a predetermined quantity of the compound of the present invention. The quantity of the compound contained in the unit dosage form is directly dependent upon the considerations which are well-known in the art of compounding a pharmaceutically active material for therapeutic use. The characteristics of the active compound, the particular therapeutic effect to be achieved, the route of administration and the mechanism of the action of the material in the host are important considerations in determining the quantity of the active compound included in the unit dosage form. Examples of suitable oral unit dosage forms are capsules, pills, tablets, cachets and powder packets for solid compositions, and teaspoonfuls, dropperfuls, ampoules and vials for liquid oral dosage forms.

The tablets or pills can be laminated or otherwise compounded to provide for time-release action of the active compound. For example, the tablet or pill can comprise an inner portion constituting one unit dose and an outer portion constituting another unit dose, the outer portion being in the form of an envelope encompassing the inner portion. The two portions can be separated by an enteric layer which serves to delay the release of the active compound contained in the inner portion by resisting disintegration in the stomach thereby allowing it to pass intact into the intestine where the enteric layer is destroyed releasing the active compound in the inner portion. Such an enteric layer may consist of any number of known substances such as polymeric derivatives or mixtures thereof, cellulose acetate, cetyl alcohol, shellac, cellulose acetate phthalate and the like.

Examples of oral liquid dosage forms include aqueous solutions, hydroalcoholic solutions, and aqueous or oil suspensions and emulsions wherein the product is dissolved or dispersed in a pharmaceutically acceptable carrier or vehicle. Flavoring agents may be added to increase the palatability of the dosage form. Examples of vehicles are cottonseed oil, sesame oil, peanut oil and the like and acceptable dispersing agents for aqueous suspensions include synthetic and natural gums such as tragacanth, acacia, dextran, methyl cellulose and the like.

Suppositories containing the compounds of the instant invention can be readily prepared in a unit dosage form by mixing the active ingredient with a commonly used suppository base such as theobroma oil, glycerinated gelatin or a polyethylene glycol, and then shaping the mass into a form suited for introduction into the rectum.

The compounds of the instant invention are readily adaptable for use in combination with other widely used drugs, especially those drugs that are commonly formulated with the barbiturates or hypnotic-sedative drugs in general, a few examples of which are amphetamines, sympathomimetics in general, and with scopolamine as a general anesthetic, etc.

The process for the preparation of trihaloethyl glycinates of the formula

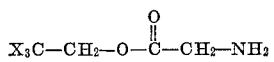

wherein X represents bromo or chloro, comprises acylating a 2,2,2-trihaloethanol with a compound of the formula

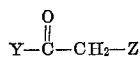

wherein Y is selected from the group consisting of —O-(lower)alkyl, chloro, bromo, iodo and hydroxyl, and Z is selected from the group consisting of amino, chloro, bromo and iodo; or with the functional equivalent of

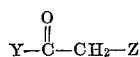

as an acylating agent for a primary alcohol to produce a compound having the formula

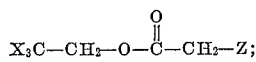

and when Z is chloro, bromo or iodo, further reacting the intermediate product with liquid ammonia or concentrated NH$_4$OH to produce the desired product.

The functional equivalents are well known to those skilled in the art and include the corresponding acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester or thioester (e.g. with p-nitro-phenol, 2,4-dinitro-phenol, thiophenol, thioacetic acid) may be used or the free acid itself may be coupled with the trihaloethanol after first reacting said free acid with N,N'-dimethylchloroformiminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African patent specification 63/2684] of a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc. 80, 4065 (1958)] or of an isoxazolium salt reacent [cf. R. B. Woodward, R. A. Olofson and H. Mayer, J. Amer. Chem. Soc. 83, 1010 (1961)].

Another equivalent of the acylating agent is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole.

When Y is hydroxy or —O-(lower)alkyl, the reaction is preferably performed in the presence of an acid catalyst; it may be performed using a strong acid as both catalyst and solvent, i.e., concentrated sulfuric acid, polyphosphoric acid, etc.

The reaction is usually conducted at a temperature in the range of about —20 to 100° C., and usually in the presence of some reaction inert solvent.

When the reaction is complete, the product is isolated by neutralization of any acid present by the addition of a base, i.e. NaHCO$_3$, Na$_2$CO$_3$, NaOH, etc., followed by extraction with a water-immiscible solvent.

The following preferred method may be used to prepare the compounds of this invention:

Equimolar quantities of the 2,2,2-trihaloethanol and glycinate are slowly added to concentrated sulfuric acid at about 0–10° C. with rapid stirring. The mixture is allowed to warm to room temperature, is stirred until solution occurs, and then stored as such in the range of 20° C. to about 60° C.

The concentrated acid solution is cautiously poured onto crushed ice, diluted with water and cooled in a salt-ice bath. The crystals are collected, placed into water and neutralized to pH 7 with powdered NaHCO$_3$. The aqueous mixture is extracted with ether, the ether extract washed with water and dried over Na$_2$SO$_4$.

The bubbling of hydrogen chloride into the ether extract produces fine white crystals which are thoroughly washed with ether and dried in vacuo to yield 2,2,2-trichloroethyl glycinate hydrochloride, M.P. 210–212° C. The nuclear magnetic resonance (NMR) and infrared spectra (IR) are consistent with the structure of the product.

The therapeutic utility of the compounds of the present invention are as sedatives and hypnotics, and when used parenterally in high enough dosages, as general anesthetics. The compounds of the invention, in particular the 2,2,2-trichloroethyl glycinate hydrochloride, have been found to be as effective as chloral hydrate in producing sedation when administered on a molar equivalent dosage basis to dogs and mice.

Chloral hydrate is reported to have a single sedative dose range in humans of 0.25 gram to 2.00 grams with a maximum twenty-four hours dose of about 4.0 grams. In veterinary use, depending upon the animal, the single dose is in a range of 0.6 to 1.3 grams per 100 lbs. body weight for sedation and 4–8 grams per 100 lbs. body weight for deep narcosis or surgical anesthesia.

References (1) Merck Index, 8th edition, Merck & Co., Inc. Rahaway, N.J., p. 232 (1969).

(2) United States Phamacopeia, Seventeeth Revision, pp. 111–112 (1965).

The compounds of the present invention are essentially as effective as chloral hydrate when administered on a molar equivalent dosage basis, i.e. 150 mg. of 2,2,2-trichloroethyl glycinate hydrochloride will produce approximately the same sedative effect as 100 mg. of chloral hydrate.

A preferred embodiment of the persent invention is the method of producing sedation or narcosis in a living mammal by administering a dose in the range of about 0.004 gram to about 0.085 gram per kilogram of body weight of the compound having the formula

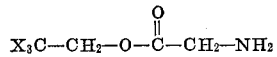

in which X is chloro or bromo; or a pharmaceutically acceptable salt thereof.

A more preferred embodiment is the method of producing sedation in a living mammal by administering a dose in the range of about 0.004 gram to about 0.045 gram per kilogram of body weight of the compound having the formula

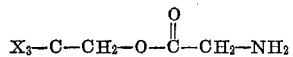

in which X is chloro or bromo; or a pharmaceutically acceptable salt thereof.

Another more preferred embodiment is the method of producing sedation in a living mammal, administering a dose in the range of about 0.004 gram to about 0.045 gram per kilogram of body weight of the compound having the formula

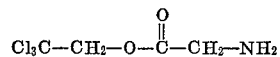

or a pharmaceutically acceptable salt thereof.

A most preferred embodiment is the method of producing sedation in a living mammal by administering a dose in the range of about 0.004 gram to about 0.045 gram/kilogram of body weight of 2,2,2 - trichloroethyl gycinate hydrochloride.

Another most preferred embodiment is the method of producing sedation in a living mammal by administering orally in unit dosage form a dose in the range of about 0.004 gram to about 0.045 gram per kilogram of body weight of 2,2,2 - trichloroethyl glycinate hydrochoride.

The following examples will serve to illustrate but not to limit the scope of the present invention.

DESCRIPTION OF THE PREFERRED EMBODIMENTS

EXAMPLE 1

2,2,2-trichlorethyl glycinate hydrochloride

Fifty grams of trichloroethanol was slowly added to 75 ml. of rapidly stirred concentrated sulfuric acid that was previously cooled to 0° to 10° C. and which was maintained at that temperature by an ice bath. 12.5 grams of glycine was added with stirring and then the ice bath was removed to allow the mixture temperature to rise to room temperature.

After solution was obtained, the solution was allowed to stand at room temperature for 4 days, during which time the solution partially crystallized into a light brown slurry. After standing an additional 2 days, the slurry was mixed with sufficient ice to dilute the mixture to 300 ml. The mixture was cooled in an ice-salt bath, and the solids collected by filtration. The solids were slurried again in fresh water, and treated with powdered $NaHCO_3$ to raise the pH to about 7.0. At pH 7.0 a clear solution resulted which was extracted with several portions of ethyl ether. The extract was dried over $Na_2SO_4$, filtered and saturated with dry hydrogen chloride gas to produce a fine white precipitate which was collected, washed with cold dry ether and subsequently dried in vacuo to produce the desired 2,2,2-trichloroethyl glycinate hydrochloride, M.P. 210–212° C. The IR and NMR spectra were consistent with the structure of the desired product.

EXAMPLE 2

2,2,2-tribromoethyl glycinate hydrochloride

Substitution in the procedure of Example 1 for the 2,2,2 - trichloroethanol used therein of 2,2,2 - tribromoethanol produces 2,2,2 - tribromethyl glycinate hydrochloride.

EXAMPLE 3

2,2,2-trichloroethyl glycinate hydrochloride

Ten grams of 2,2,2-trichloroethanol was added to 15 ml. of concentrated sulfuric acid at 0°–10° C. with rapid stirring followed by 2.5 g. of glycine. The mixture was allowed to gradually warm to room temperature and then stored for six days at 56° C.

After cooling to 0° C., the mixture was poured onto crushed ice. The resultant solution (80 ml.) deposited an oil which solidified on cooling in an ice-salt bath. The solidified oil was collected, slurried in water and neutralized to pH 7 with sodium bicarbonate powder. The resultant oil was extracted from the water with ethyl ether, the ether extract dried over $Na_2SO_4$, filtered and treated with a stream of dry hydrogen chloride gas until saturated. The resultant white precipitate was collected, washed well with dry ether, dried in vacuo to produce the desired 2,2,2 - trichloroethyl glycinate hydrochloride.

While in the foregoing specification various embodiments of this invetion have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. The method of producing sedation in a mammal which comprises administering to said mammal a dose in the range of about 0.004 gram to about 0.085 gram per kilogram of body weight of the compound having the formula

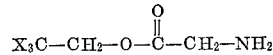

in which X is chloro or bromo; or a pharmaceutically acceptable salt thereof.

2. The method of claim 1 for producing sedation which comprises administering a dose in the range of about 0.004 gram to about 0.045 gram per kilogram of body weight.

3. The method of claim 1 for producing sedation which comprises administering a dose in the range of about 0.004 gram to about 0.045 gram per kilogram of body weight of the compound having the formula

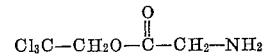

or a pharmaceutically acceptable salt thereof.

4. The method of claim 3 in which the compound administered in 2,2,2 - trichloroethyl glycinate hydrochloride.

5. The method of producing sedation in a mammal which comprises administering to said mammal orally in unit dosage form a dose in the range of about 0.004 gram to about 0.045 gram per kilogram of body weight of 2,2,2 - trichloroethyl glycinate hydrochloride.

References Cited

UNITED STATES PATENTS

| | | | |
|---|---|---|---|
| 1,427,506 | 2/1922 | Willstutter | 260—482 |
| 2,584,846 | 2/1952 | Cusie et al. | 260—482 |
| 3,223,725 | 12/1965 | Hill | 260—471 |

OTHER REFERENCES

Richter et al.: The Effect of Trichloroethanol on Amino Acids and Proteins, Acta Universitatis Carolinae, Medical Supplement 14/1961, pp. 265–270.

Burtner et al.: J. Pharmacology, vol. 63 pp. 183–192 (1938).

Mikikova et al.: Chem. Ab., vol. 56: 10,506(g) (1962).

Richter et al.: Chem. Ab., vol. 57: 15,466(g) (1962).

Farasiu, Chem. Ab. vol. 62: 13,071(e) (1965).

Wolffenstein et al.: Berichte, vol. 48, pp. 2035–2043 (1915).

Feist: Berichte, vol. 45, pp. 945–962 (1912).

Greenberg: "Amino Acids and Proteins," Charles C. Thomas, publisher, p. 32 (1951).

Derwent: Basic No. 15,810 (French Medical Pat. 3049M), 8-2-65.

JEROME D. GOLDBERG, Primary Examiner

U.S. Cl. X.R.

260—482